F. A. MUSSER.
COOKING UTENSIL.
APPLICATION FILED JAN. 17, 1908.

936,343.

Patented Oct. 12, 1909.

Witnesses
C. E. Smith.
E. B. McBath.

Inventor
F. A. Musser.
By O'Meara Burch
Attorney

UNITED STATES PATENT OFFICE.

FLAVEL AUGUSTUS MUSSER, OF ALTOONA, PENNSYLVANIA.

COOKING UTENSIL.

936,343.  Specification of Letters Patent.  Patented Oct. 12, 1909.

Application filed January 17, 1908. Serial No. 411,365.

*To all whom it may concern:*

Be it known that I, FLAVEL A. MUSSER, a citizen of the United States, residing at Altoona, in the county of Blair and State of Pennsylvania, have invented a new and useful Improvement in Cooking Utensils, of which the following is a specification.

This invention relates to a cooking utensil, the object of which is a sectional skillet in which either section may be employed separately as a frying pan or spider, and when combined as one device may be used for broiling, or as a waffle maker for use especially with gas stoves, the ordinary waffle iron not being suited for such use.

The invention consists of the novel features of construction hereinafter described, pointed out in the claim, and shown in the accompanying drawings, in which—

Figure 1:
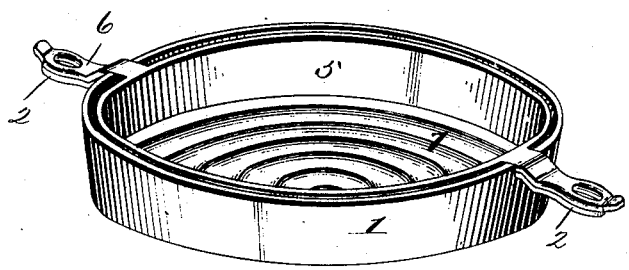
Figure 2:
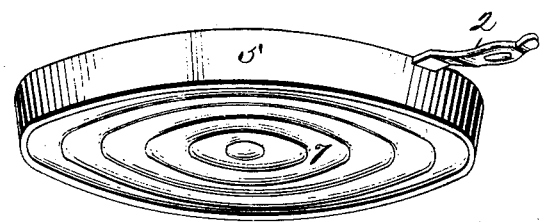
Figure 3:
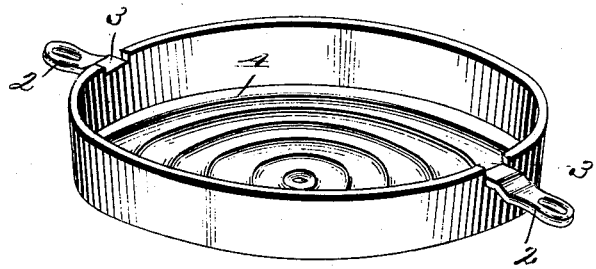
Figure 4:
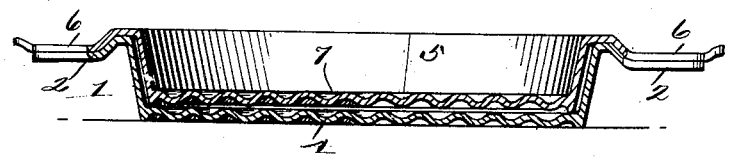

Figure 1 is a perspective view of the complete device. Fig. 2 is an inverted perspective view of the upper section. Fig. 3 is a perspective view of the lower section. Fig. 4 is a transverse sectional view showing the two sections fitted together.

In these drawings 1 represents a base section which is provided upon opposite sides with handle portions 2, the sides extending above said handles and being notched as shown at 3 in alinement with the handles. The bottom is corrugated as shown at 4. The upper section consists of a skillet 5 provided upon its opposite sides with handles 6 of slightly greater length than the handles 2 and the handles 6 fit in the notches 3, and bear upon and extend beyond the handles 2. The section 5 is also corrugated upon the bottom as shown at 7, the said corrugations being offset with respect to those of the lower section. When the two sections are fitted together a slight space is therefore left between the two sections, so that the use of the device as a broiler and a waffle pan will be obvious.

Having thus fully described my invention, what I claim as new and desire to secure by Letters Patent, is:—

A cooking utensil consisting of upper and lower sections, said sections having corrugated bottoms, the corrugations of one section being offset with respect to those of the other, the lower section having oppositely arranged handles, the sides of said lower section being notched in alinement with the handles, and handles carried by the upper section, said handles fitting in the notches of the lower section and bearing upon and extending beyond the handles of the lower section.

FLAVEL AUGUSTUS MUSSER.

Witnesses:
 PHILP. B. DILLEN,
 C. A. DUKE.